United States Patent
Ito et al.

(10) Patent No.: US 6,524,209 B2
(45) Date of Patent: Feb. 25, 2003

(54) ABSOLUTE SENSOR

(75) Inventors: Yoshinori Ito, Nagano-ken (JP); Hiroshi Kameda, Nagano-ken (JP); Toshiyuki Abe, Nagano-ken (JP); Toshiaki Kamata, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 09/971,006

(22) Filed: Oct. 5, 2001

(65) Prior Publication Data

US 2002/0088293 A1 Jul. 11, 2002

(30) Foreign Application Priority Data

Oct. 17, 2000 (JP) ........................................ 2000-316902

(51) Int. Cl.[7] .................................................. F16H 1/32
(52) U.S. Cl. .......................... 475/162; 475/162; 33/1 PT
(58) Field of Search ................................ 475/162, 176; 74/409; 33/1 PT

(56) References Cited

U.S. PATENT DOCUMENTS

| | | | | | |
|---|---|---|---|---|---|
| 4,679,465 A | * | 7/1987 | Goto et al. | ................ | 475/180 |
| 4,699,024 A | * | 10/1987 | Iida et al. | ................... | 475/162 |
| 5,187,724 A | * | 2/1993 | Hibino et al. | ................. | 377/17 |
| 5,359,884 A | * | 11/1994 | Fey et al. | .................. | 73/118.1 |
| 5,930,905 A | * | 8/1999 | Zabler et al. | ............... | 33/1 PT |
| 6,410,909 B1 | * | 6/2002 | Rudolph et al. | ....... | 250/231.13 |

\* cited by examiner

*Primary Examiner*—Rodney H. Bonck
*Assistant Examiner*—Dennis Abdelnour
(74) *Attorney, Agent, or Firm*—Burns, Doane, Swecker & Mathis, L.L.P.

(57) ABSTRACT

An absolute sensor 1 has a high speed side encoder 13 mounted on a high speed rotational shaft 6, a low speed rotational shaft 11 arranged coaxially with the high speed rotational shaft 6, a planetary gear mechanism 10 for reducing the speed of rotation of the high speed rotational shaft 6 and delivering the rotation of reduced speed to the low speed rotational shaft 11. The planetary gear mechanism 10 has a fixed sun internal gear a, a front stage planetary gear b, a rear stage planetary gear c, and an output sun internal gear d connected to the rear stage planetary gear c and low speed rotational shaft 11, wherein the planetary gears b and c are rotatably supported by an eccentric shaft portion 23 of the shaft 6. The planetary gear mechanism 10 can be constituted so that the input and output shafts are arranged coaxially, and can be made small with having a large reduction ratio in comparison with the conventional reduction mechanism comprised by spur gears.

20 Claims, 2 Drawing Sheets

S: High speed rotational shaft 6
D: Low speed rotational shaft 11
$Z_a$: Fixed sun internal gear
$Z_b$: Front stage planetary gear
$Z_c$: Rear stage planetary gear
$Z_d$: Output sun internal gear
$\eta$ : Efficiency $$U_1 = \frac{Z_a}{Z_b}$$

$$U_2 = \frac{Z_d}{Z_c}$$

$$i = \frac{U_2}{U_2 - U_1} \quad \left( = \frac{Z_b Z_d}{Z_b Z_d - Z_a Z_c} \right)$$

$$\eta = \frac{U_2 - U_1}{U_2 - \eta_0 U_1}$$

wherein $\eta_0 = \eta_1 \eta_2$

ABSOLUTE SENSOR

CROSS-REFERENCE TO RELATED APPLICATIONS

The present application claims the priority of Japanese Patent Application No. 2000-316902 filed in Japan on Oct. 17, 200, the entire contents of which is hereby incorporated herein by reference.

BACKGROUND OF THE INVENTION

1. Field of the Invention

This invention relates to an absolute sensor for detecting an absolute rotational angular position of a rotational shaft.

2. Description of Related Art

As the conventional absolute sensor for detecting an absolute rotational angular position of a rotational shaft, there is known one that has a reduction mechanism constituted by spur gears. The sensor of this type typically comprises a reduction mechanism constituted by a combination of spur gears, a high speed rotational shaft for inputting a high speed rotation into the reduction mechanism, a low speed rotational shaft which is transferred a low speed rotation obtained via the reduction mechanism, and encoders for detecting a rotational angle or rotational speed of the high and low speed rotational shafts, respectively. Based on the respective outputs of the encoders, the absolute rotational angular position of the low speed rotational shaft, for example, can be detected, in which the resolution of detection corresponds to the reduction ratio of the reduction mechanism.

The conventional absolute sensor of this type, however, has the following defects. First, since the reduction mechanism is constituted by a plurality of spur gears, the high speed rotational shaft at the input side cannot be aligned coaxially with the low speed rotational shaft at the reduced rotational speed output side. Second, it is difficult for the reduction mechanism constituted by the combination of a plurality of spur gears to obtain a high reduction ratio, so that a high resolution sensor cannot be realized. Third, a plurality of gears must be connected to achieve a desired reduction ratio, which is against downsizing of the sensor.

OBJECTS AND SUMMARY

An object of this invention is, in view of the above points, to provide an absolute sensor in which input side and output side rotational shafts can be aligned coaxially.

Another object of this invention is to provide a small absolute sensor which has a high resolution.

Another object of this invention is to provide an absolute sensor in which a reduction ratio thereof is set a power of two so that output signals of encoders thereof can be easily processed by a computer system.

In order to solve the above and other objects, there is provided an absolute sensor which comprises a high speed rotational shaft, a planetary gear mechanism for reducing a high rotational speed delivered from the high speed rotational shaft, a low speed rotational shaft which is aligned coaxially with the high speed rotational shaft and is delivered reduced speed rotation from the planetary gear mechanism, a high speed side encoder for detecting a rotational speed or rotational angle of the high speed rotational shaft, and a low speed side encoder for detecting a rotational speed or rotational angle of the low speed rotational shaft.

The planetary gear mechanism is constituted to have a fixed sun internal gear, a front stage planetary gear, a rear stage planetary gear which rotates integrally with the front stage planetary gear, and an output sun internal gear engaged with the rear stage planetary gear.

The front stage and rear stage planetary gears are rotatably supported by an eccentric shaft portion formed on the high speed rotational shaft and are maintained in a condition engaged with the fixed sun and output sun internal gears, and the output sun internal gear is connected to the low speed rotational shaft.

The absolute sensor of this invention detects an absolute rotational angle of the low speed or high speed rotational shaft based on outputs of the high speed side and low speed side encoders.

Figure 1:
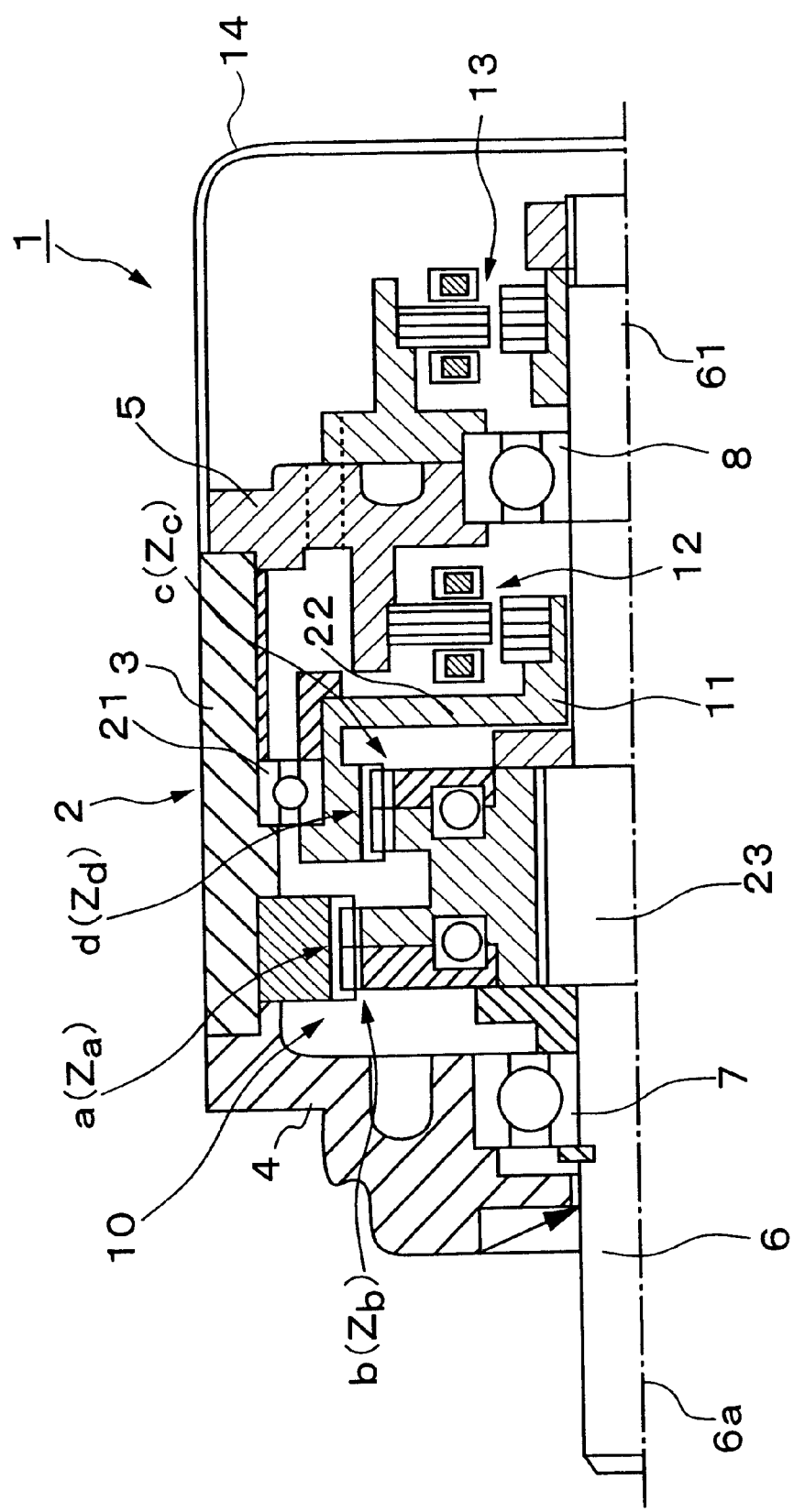
FIG. 1 is a semi-sectional view of an absolute sensor according to this invention.

Symbols:
1 Absolute sensor
2 Housing
3 Body portion
4,5 End plates
6 High speed rotational shaft
7,8 Bearings
10 Planetary gear mechanism
11 Low speed rotational shaft
12 Low speed side encoder
13 High speed side encoder
23 Eccentric shaft portion

DETAILED DESCRIPTION OF THE PREFERRED EMBODIMENTS

With reference to the drawings, an example of an absolute sensor according to this invention will now be described.

FIG. 1 is a semi-sectional view of an absolute sensor of this example. As shown in this drawing, the absolute sensor 1 has a housing 2 having an annular shape as a whole and constituted by an annular body portion 3 and end plates 4 and 5 fixed to both ends of the body portion 3. A high speed rotational shaft 6 extends passing through the center of the housing 2 and is rotatably supported on the housing by means of bearings 7 and 8 mounted on inner circumferential surfaces of center holes formed in the respective end plates 4 and 5.

Inside the housing 2, there is assembled an inside-revolution-type planetary gear mechanism 10 for reducing speed of rotation of the high rotational shaft 6. The planetary gear mechanism 10 has a low speed rotational shaft from which rotation of reduced speed is output, which, in this example, is a hollow low speed rotational shaft 11 arranged coaxially around an outer circumferential surface of the high speed rotational shaft 6. The rotational speed or rotational angle of the hollow low speed rotational shaft 11 is detected by a low speed side encoder 12 accommodated in the housing 2.

The high speed rotational shaft 6 has an end portion 61 projecting outward from the end plate 5 of the housing, on which a high speed side encoder 13 is mounted for detecting the rotational speed or rotational angle of the high speed rotational shaft 6. The high speed encoder 13 is covered by a cup-shaped encoder case 14 which is fixed to the housing 2.

Figure 2:
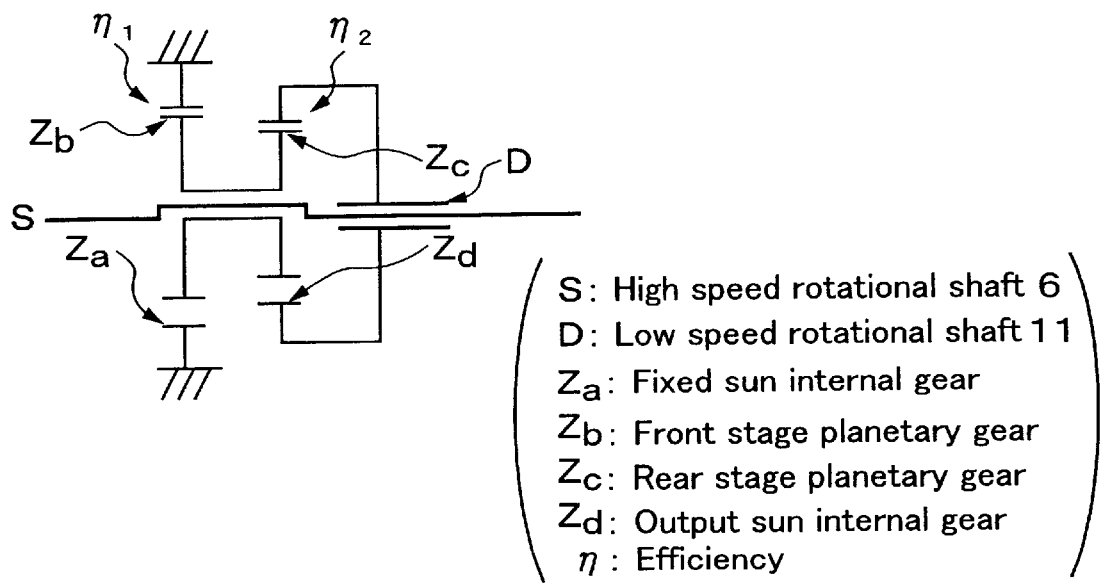
FIG. 2 is a skeleton diagram of a planetary gear mechanism assembled in the absolute sensor of FIG. 1.

FIG. 2 is a skeleton diagram of the planetary gear mechanism 10 assembled inside the housing 2. Referring to this figure also, the planetary gear mechanism 10 will be more explained. The planetary gear mechanism 10 has a fixed sun internal gear a (its number of teeth is Za), a front stage planetary gear b (its number of teeth is Zb), a rear stage planetary gear c (its number of teeth is Zc), and an output sun internal gear d (its number of teeth is Zd). The planetary gears c and d of this example may be a composite gear such as scissors-type gears, respectively. The fixed sun internal gear a is fixed on the inner circumferential surface of the housing body portion 3, and the front stage planetary gear b is arranged inside the fixed sun internal gear a and is engaged therewith. The rear stage planetary gear c is arranged adjacent to the front stage planetary gear b and rotates integrally therewith. Further, the output sun internal gear d is arranged around the rear stage planetary gear c and is engaged therewith. The output sun internal gear d is rotatably supported on the inner circumferential surface of the housing body portion 3 via a bearing 21. The output sun internal gear d has a circular end surface formed with a disc-shaped connecting portion 22 projecting therefrom, and an inner end portion of the connecting portion 22 is integrally connected with the hollow low speed rotational shaft 11.

The high speed rotational shaft 6 is formed with an eccentric shaft portion 23, and the front and rear stage planetary gears b and c are rotatably supported by this eccentric shaft portion 23. Thus, as the high speed rotational shaft 6 rotates, the respective planetary gears b and c rotate about the center axial line 6a.

The thus constituted planetary gear mechanism 10 has a reduction ratio i which can be obtained by the formula shown in FIG. 2. In this example, the number of teeth of each gear is set as listed on the second line of Table 1, and difference in number of teeth at the front stage side and that at the rear stage side are set four, respectively. In this case, the reduction ratio i is 256 which is a power of two. Likewise, as listed on the three and fourth lines of Table 1, the reduction ratio is 1024 when the difference in number of teeth is two and is 4098 when that is one, both being a power of two.

In addition, as shown in Table 2, when the difference in number of teeth is eight and nine, the reduction ratio becomes 512, and when that is 25 and 18, the reduction ratio becomes 2048. Thus, in either cases, the values of the reduction ratio are a power of two.

TABLE 1

| Gear | Difference | $Z_a$ | $Z_b$ | $Z_c$ | $Z_d$ | i | Efficiency % |
|---|---|---|---|---|---|---|---|
| Number of Teeth | 4 | 68 | 64 | 60 | 64 | 256 | 43.5 |
| Number of Teeth | 2 | 66 | 64 | 62 | 64 | 1024 | 18.2 |
| Number of Teeth | 1 | 65 | 64 | 63 | 64 | 4096 | 4.9 |

TABLE 2

| Gear | Difference | $Z_a$ | $Z_b$ | $Z_c$ | $Z_d$ | i | Efficiency % |
|---|---|---|---|---|---|---|---|
| Number of Teeth | 9, 8 | 73 | 64 | 56 | 64 | 512 | 25.6 |

TABLE 2-continued

| Gear | Difference | $Z_a$ | $Z_b$ | $Z_c$ | $Z_d$ | i | Efficiency % |
|---|---|---|---|---|---|---|---|
| Number of Teeth | 25, 18 | 89 | 64 | 46 | 64 | 2048 | 7.4 |

Next, the low speed side encoder 12 and high speed side encoder 13 may be of any detection type. For example, potentiometer, photo encoder, resolver, magnetic induction type position sensor and other types of encoder can be employed.

Since the planetary gear mechanism 10 of the absolute sensor 1 has a reduction ratio of 256, the low speed rotational shaft 11 is driven to rotate one time as the high speed rotational shaft 6 rotates 256 times. Each of the rotational angular positions of the respective rotational shafts 6 and 11 can be detected based on each of the detection signals of the respective encoders 13 and 12. Further, the absolute rotational position of the rotational shaft 11 can be detected accurately based on the detection signals of the both encoders 13 and 12.

As aforementioned, the absolute sensor of this invention is provided with the inner-revolution-type planetary gear mechanism which is able to align the output and input shafts coaxially and has a reduction ratio of a power of two. Accordingly, in comparison with the conventional absolute sensor having the reduction mechanism comprised by spur gears, the reduction ratio can be increased with a less number of gears, so that downsizing of the sensor can be achieved and the absolute rotational angular position of the rotational shaft can be detected accurately. Moreover, since the value of the reduction ratio of the planetary gear mechanism is a power of two, it is easy for a computer system to process the output signals of the encoders, which is advantageous.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An absolute sensor comprising:
   a high speed rotational shaft;
   a planetary gear mechanism for reducing a high rotational speed delivered from the high speed rotational shaft;
   a low speed rotational shaft which is aligned coaxially with the high speed rotational shaft and to which is delivered a reduced speed rotation from the planetary gear mechanism;
   a high speed side encoder for detecting a rotational speed or rotational angle of the high speed rotational shaft; and
   a low speed side encoder for detecting a rotational speed or rotational angle of the low speed rotational shaft;
   the planetary gear mechanism has a fixed sun internal gear, a front stage planetary gear, a rear stage planetary gear which rotates integrally with the front stage planetary gear, and an output sun internal gear engaged with the rear stage planetary gear; and
   the front stage and rear stage planetary gears are rotatably supported by an eccentric shaft portion formed on the high speed rotational shaft and are maintained in a condition engaged with the fixed sun and output sun internal gears, and the output sun internal gear is connected to the low speed rotational shaft, whereby an absolute rotational angle of the low speed or high speed rotational shaft is detected based on outputs of the high speed side and low speed side encoders.

2. The absolute sensor of claim 1, wherein the rear stage planetary gear and the output sun internal gear are a scissors-type composite gear.

3. The absolute sensor of claim 1, further comprising an annular body, and the fixed sun internal gear is fixed to an internal surface of the annular body.

4. The absolute sensor of claim 3, further comprising a bearing between the internal surface of the annular body and the output sun internal gear, and the output sun internal gear is rotatably supported by the bearing.

5. The absolute sensor of claim 1, wherein the planetary gear mechanism has a reduction ratio of 256.

6. The absolute sensor of claim 1, wherein the planetary gear mechanism has a reduction ratio of 512.

7. The absolute sensor of claim 1, wherein the planetary gear mechanism has a reduction ratio of 1024.

8. The absolute sensor of claim 1, wherein the planetary gear mechanism has a reduction ratio which is a power of 2.

9. The absolute sensor of claim 1, wherein the high speed side encoder is for detecting a rotational speed of the high speed rotational shaft.

10. The absolute sensor of claim 9, wherein the low speed side encoder is for detecting a rotational angle of the low speed rotational shaft.

11. The absolute sensor of claim 10, wherein the planetary gear mechanism has a reduction ratio which is a power of 2.

12. The absolute sensor of claim 9, wherein the low speed side encoder is for detecting a rotational speed of the low speed rotational shaft.

13. The absolute sensor of claim 12, further comprising an annular body, and the fixed sun internal gear is fixed to an internal surface of the annular body.

14. The absolute sensor of claim 13, further comprising a bearing between the internal surface of the annular body and the output sun internal gear, and the output sun internal gear is rotatably supported by the bearing.

15. The absolute sensor of claim 12, wherein the planetary gear mechanism has a reduction ratio of 256.

16. The absolute sensor of claim 12, wherein the planetary gear mechanism has a reduction ratio of 512.

17. The absolute sensor of claim 12, wherein the planetary gear mechanism has a reduction ratio of 1024.

18. The absolute sensor of claim 12, wherein the planetary gear mechanism has a reduction ratio which is a power of 2.

19. The absolute sensor of claim 1, wherein the high speed side encoder is for detecting a rotational angle of the high speed rotational shaft.

20. A method of determining an absolute rotational angle, the method comprising the steps of:

delivering a rotational force to a high speed rotational shaft;

transferring the rotational force from the high speed rotational shaft to a low speed rotational shaft with a planetary gear mechanism, wherein the low speed rotational shaft is aligned coaxially with the high speed rotational shaft;

detecting a rotational speed or rotational angle of the high speed rotational shaft with a high speed side encoder;

detecting a rotational speed or rotational angle of the low speed rotational shaft with a low speed side encoder; and determining an absolute rotational angle of the low speed or high speed rotational shaft based on outputs of the high speed side and low speed side encoders.

* * * * *